(12) United States Patent
Thompson

(10) Patent No.: US 10,458,273 B2
(45) Date of Patent: Oct. 29, 2019

(54) BLADE VIBRATION MONITOR WITH SELF ADJUSTING SENSOR GAP MECHANISM

(71) Applicant: SIEMENS ENERGY, INC., Orlando, FL (US)

(72) Inventor: Edward David Thompson, Casselberry, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 188 days.

(21) Appl. No.: 15/658,442

(22) Filed: Jul. 25, 2017

(65) Prior Publication Data
US 2019/0032506 A1 Jan. 31, 2019

(51) Int. Cl.
*F01D 21/00* (2006.01)
*G01H 9/00* (2006.01)
(Continued)

(52) U.S. Cl.
CPC .............. *F01D 21/003* (2013.01); *F01D 5/12* (2013.01); *G01B 11/14* (2013.01); *G01H 9/00* (2013.01); *G01M 15/14* (2013.01); *F05D 2220/31* (2013.01); *F05D 2240/14* (2013.01); *F05D 2240/24* (2013.01); *F05D 2260/80* (2013.01)

(58) Field of Classification Search
CPC ...... F01D 21/003; F01D 5/12; F05D 2220/31; F05D 2240/14; F05D 2240/24; F05D 2260/80; G01B 11/14; G01H 9/00; G01H 9/004; G01M 15/14
See application file for complete search history.

(56) References Cited

U.S. PATENT DOCUMENTS

| 4,887,468 A * | 12/1989 | McKendree | ........... G01H 1/006 73/660 |
| 8,922,203 B2 * | 12/2014 | Wickstead | ............. G01B 21/16 324/207.13 |

(Continued)

FOREIGN PATENT DOCUMENTS

| JP | H09101199 A | 4/1997 |
| JP | 2011252875 A | 12/2011 |
| JP | 2015114141 A | 6/2015 |

OTHER PUBLICATIONS

PCT International Search Report and Written Opinion of International Searching Authority dated Oct. 5, 2018 corresponding to PCT International Application No. PCT/US2018/035775 filed Jun. 4, 2018.

*Primary Examiner* — Francis C Gray

(57) ABSTRACT

A blade vibration monitor including a self-adjusting sensor gap mechanism is provided. The blade vibration monitor includes a probe configured to be disposed in a mounting hole within a turbine casing of a steam turbine. A proximity sensor is disposed within a tip of the probe producing a signal in response to a turbine blade passing the sensor. A positioning means is used to position a depth of the probe with respect to the mounting hole. A processor processes the signal to determine a gap distance between the probe and the turbine blade. Based on the determined gap distance the processor controls the positioning means to adjust the probe depth relative to the mounting hole in order to set the gap distance in real time to a minimal gap distance. A method for setting a gap distance between a turbine blade tip and a proximity sensor is also provided.

20 Claims, 2 Drawing Sheets

(51) Int. Cl.
*G01B 11/14* (2006.01)
*F01D 5/12* (2006.01)
*G01M 15/14* (2006.01)

(56) References Cited

U.S. PATENT DOCUMENTS

| | | | | |
|---|---|---|---|---|
| 2001/0013582 A1* | 8/2001 | Johnson | ............... | F01D 11/08 |
| | | | | 250/559.29 |
| 2003/0222640 A1* | 12/2003 | Twerdochlib | ......... | F01D 21/003 |
| | | | | 324/207.17 |
| 2009/0078052 A1* | 3/2009 | Twerdochlib | .......... | G01H 1/003 |
| | | | | 73/660 |
| 2016/0282497 A1* | 9/2016 | Turnbeaugh | ............. | G01V 3/10 |

* cited by examiner

BLADE VIBRATION MONITOR WITH SELF ADJUSTING SENSOR GAP MECHANISM

BACKGROUND

1. Field

This disclosure generally relates to steam power plant turbine blade vibration monitoring and control systems and methods. In particular a blade vibration monitor (BVM) is presented to automatically set itself to the smallest possible gap between a passing turbine blade tip and a sensor associated with the blade vibration monitor.

2. Description of the Related Art

A high speed turbo machine, such as, for example, a steam or gas turbine, generally comprises a plurality of blades arranged in axially oriented rows, the rows of blades being rotated in response to the force of a high pressure fluid flowing axially through the machine. Due to their complex design, natural resonant mechanical frequencies of the blades may coincide with or be excited by certain blade rotational speeds and rotational harmonics thereof. To prevent excessive vibration of the blade about its normal position, prudent design practice dictates that the blades be constructed such that the frequencies of the lowest modes fall between harmonics of the operating frequency of the turbine. In addition, the blades may be excited by non-synchronous forces such as aerodynamic buffeting or flutter. In order to avoid the vibration exceeding certain levels and setting up objectionable stresses in the blades, it is common to monitor the vibrations of the blades, both during the design and testing of the turbine and during normal operation of the turbine.

Blade Vibrations Monitors (BVMs) are used in the power generation industry to measure the vibration of turbine blades while the turbine is in operation. For example, it is known to use a non-contacting proximity sensor disposed within a probe to detect blade vibrations. The probe detects the actual time-of-arrival of a blade as it passes the probe and provides a corresponding signal to a blade vibration monitor system (BVMS). The signal is then analysed to determine the time that each blade tip passed the probe. The strength of the signals increases as a gap between the sensor and the blade decreases. These systems are called tip timing systems, and the sequence of times is evaluated for each blade to resolve vibrations and frequencies of vibration.

A gap between the sensor and the blade may be set manually when the probe is installed. A safe minimum gap is typically set so that the blade doesn't hit the sensor causing extensive damage to both the steam turbine and the sensor. The gap is set as small as possible during testing to account for normal changes in the components due to short term operation, but is set to a larger distance for long term operation to account for changes in components over time due to thermal expansion effects as well as other changes from operation of the steam turbine. This increased distance degrades the signal and results in poorer quality data. Although the gap may be reset manually during periodic maintenance work, a safety margin that assumes many months or even years of operation must be considered. This causes reduced reliance on the data and places a greater responsibility on technicians who evaluate the data and must account for inaccuracies. Any decisions regarding the turbine must take the expected accuracy of the data into account, and therefore additional safety margin must be added in to recommendations for blade condition, plant operating parameters, or maintenance workscopes and schedules. This additional safety margin for engineering recommendations can cause significantly increased cost for the power plant owners and operators.

Consequently, an improved blade vibration monitor and method of setting the gap distance between a sensor and a turbine blade is desired.

SUMMARY

Briefly described, aspects of the present disclosure relates to a blade vibration monitor including a self-adjusting sensor gap mechanism and a method for setting a gap distance between a tip of a rotating turbine blade and a proximity sensor disposed in a turbine casing opposite the tip.

A first aspect provides a blade vibration monitor including a self-adjusting sensor gap mechanism. The blade vibration monitor includes a probe configured to be disposed in a mounting hole within a turbine casing of a steam turbine. A proximity sensor is disposed within a tip of the probe producing a signal in response to a turbine blade passing the sensor. A positioning means is used to position a depth of the probe with respect to the mounting hole. A processor is provided for processing the signal to determine a gap distance between the probe and the turbine blade. Based on the determined gap distance the processor controls the positioning means to adjust the probe depth relative to the mounting hole in order to set the gap distance in real time to a minimal gap distance.

A second aspect provides a blade vibration monitor including a self-adjusting sensor gap mechanism. The blade vibration monitor includes a probe configured to be disposed in a mounting hole within a turbine casing of a steam turbine. An optical proximity sensor is disposed in close proximity to the probe and configured to measure a gap distance between the probe and a turbine blade of a steam turbine engine. A positioning means is used to position a depth of the probe with respect to the mounting hole. Based on the determined gap distance a processor controls the positioning means to adjust the probe depth relative to the mounting hole in order to set the gap distance in real time to a minimal gap distance.

A third aspect of provides a method for setting a gap distance between a tip of a rotating turbine blade and a proximity sensor disposed in a turbine casing opposite the tip. The method comprises disposing a probe including the proximity sensor in a mounting hole within a turbine casing of a steam turbine engine, producing a signal by the proximity sensor in response to a turbine blade passing the proximity sensor, determining by a processor a gap distance between the probe and the turbine blade from the signal, and positioning the probe a probe depth with respect to the mounting hole by a positioning means. Based on the determined gap distance, the processor controls the positioning means to adjust the probe depth relative to the mounting hole in order to set the gap distance in real time to a minimal gap distance.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
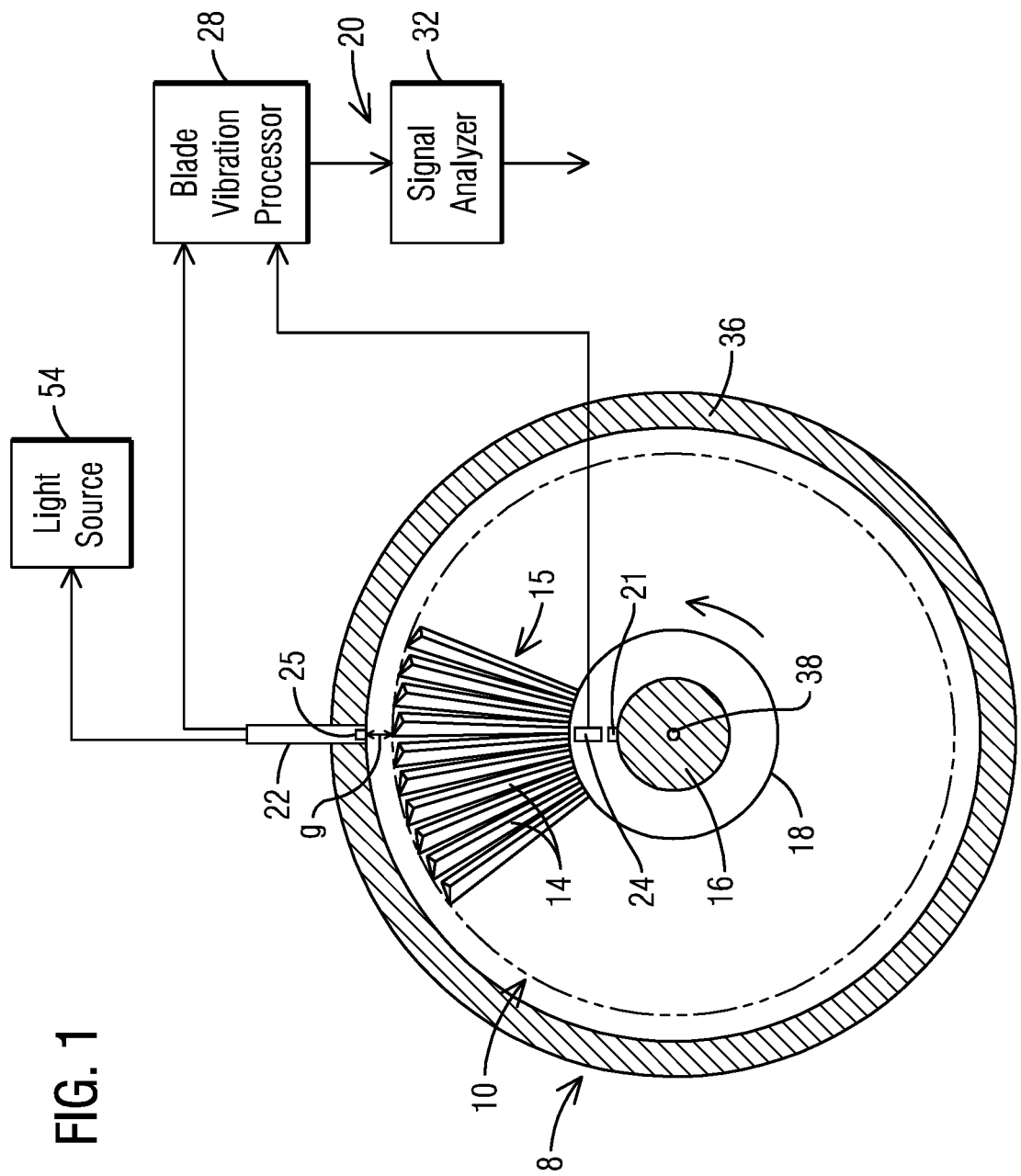
FIG. 1 illustrates a diagrammatic view illustrating a turbine and a blade vibration monitor system.

FIG. 1 diagrammatically illustrates a turbine 8 including an unshrouded blade row 10 in which the proposed method and blade vibration monitor may be employed in a blade vibration monitoring system (BVMS) to monitor vibrations of turbine blades 14. Unshrouded blades are illustrated, however, one skilled in the art would recognize that the proposed method and blade vibration monitor would also benefit a shrouded design of blades. The turbine blades 14 are connected to a rotor 16 by means of a rotor disk 18 and form a blade structure 15 within the turbine 8.

A turbine blade vibration monitoring system (BVMS) 20 is also shown in FIG. 1. The system 20 includes a turbine blade probe 22 mounted to a casing 36 of the turbine 8 for monitoring the vibration of the turbine blades 14. It should be understood that although only one probe 22 is described herein with reference to the present invention, a plurality of probes 22 may be provided in circumferentially spaced relation to each other. In some embodiments, at least two probes, a primary probe and a backup probe, may be provided adjacent to one another for redundancy.

As is further illustrated in FIG. 1, a reference sensor 24 is additionally provided. The reference sensor 24, in conjunction with an indicia 21 on the rotor 16, is operable to provide a once-per-revolution (OPR) reference pulse signal. Signals from the probe 22 and the signals from the reference sensor 24 are provided as inputs to a blade vibration processor 28. The output of the blade vibration processor 28 may be input to a signal analyser 32 to perform signal conditioning and analysis.

Figure 2:
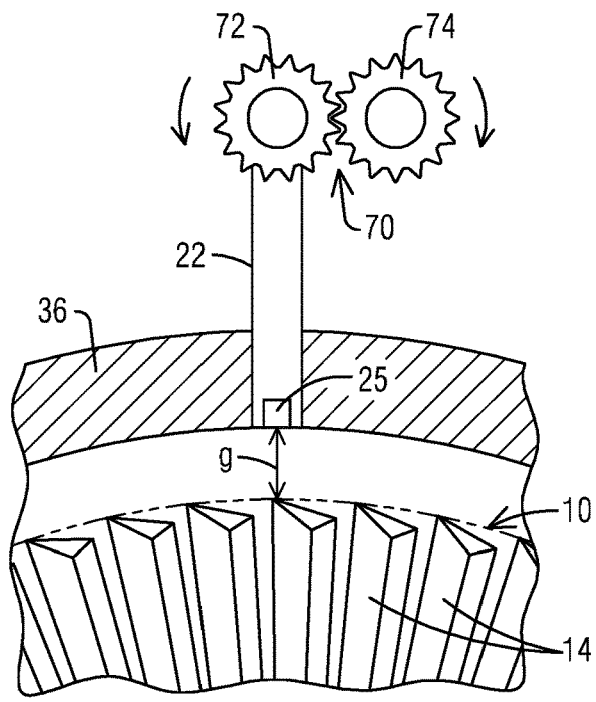
FIG. 2 illustrates a perspective view of a turbine blade and a probe opposite a gap from the turbine blade.

In accordance with an embodiment, a blade vibration monitor (BVM) includes a self-adjusting sensor gap mechanism. The BVM may comprise a probe (22) including a proximity sensor 25 disposed within a tip of the probe 22. FIG. 2 illustrates a probe 22 disposed within a mounting hole of the turbine casing 36, the turbine casing 36 surrounding the blade structure 15. When the probe 22 is installed, the tip of the probe 22 may be flush with the inner surface of the turbine casing 36 or it may be positioned such that a safe minimum gap is set. The proximity sensor 25 may produce a signal in response to a passing turbine blade 14. A gap (g) is shown between a tip of a turbine blade 14 and the tip of the probe 22 where the tip of the probe 22 is flush with the inner surface of the turbine casing 36.

Figure 3:
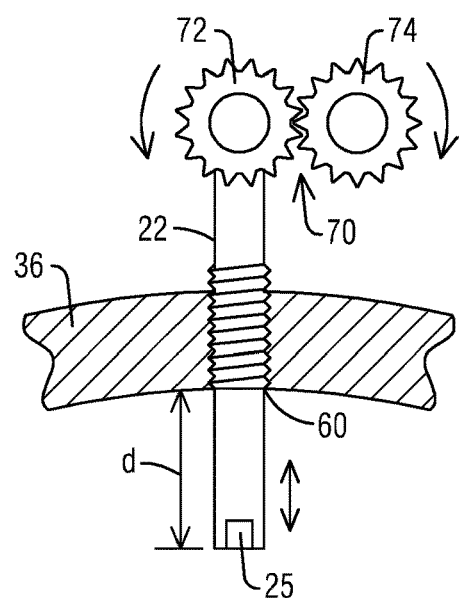
FIG. 3 illustrates a perspective view of a gear-driven positioning means to position a probe within a turbine casing.
Figure 4:
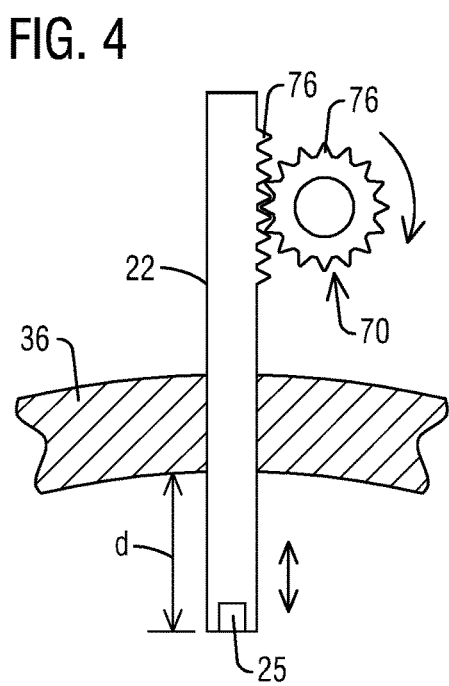
FIG. 4 illustrates a perspective view of gear and tooth arrangement as a positioning means to position a probe within a turbine casing.

As illustrated in FIGS. 3-4, a positioning means 70 may be used to position a depth of the probe 22 with respect to the mounting hole 34. For the purposes of this disclosure, the probe depth (d) will refer to the distance the probe 22 protrudes past the opening of the mounting hole on the inner surface of the turbine casing 36.

The blade vibration monitor may also include a processor 28. The processor 28 may be configured to carry out various processes and functions described herein by executing software instructions. The processor 28 may use the signal produced by the proximity sensor 25 to determine a gap distance (g) between the probe 22 and the turbine blade 14. The strength, or amplitude, of the signal may determine the gap distance (g). For example, as discussed above, the strength of the signal may increase as a gap between the sensor and the blade decreases. Based on the determined gap distance (g), the processor 28 may control the positioning means 70 to adjust the probe depth (d) in real time to a minimal gap distance determined by the processor 28.

In an embodiment, the processor 28 uses the signal along with real time turbine data to determine the minimal gap distance. The real time turbine data may include thermal data such as the thermal expansion of the turbine blade 14 under various operational conditions of the turbine. The real time turbine data may also include loading data which may include temperature and pressure data. Additionally, the wear effects of the turbine blade may be taken into account by the processor 28. For example, a ceramic coating on the tip of the probe 22 may wear during the operation of the turbine causing the thickness of the coating to decrease during prolonged operation of the steam turbine. The described list of real time turbine data is non-inclusive such that one skilled in the art would understand that other real time turbine data may be used to determine the minimal, or optimal, gap distance (g).

The described embodiments of the proposed blade vibration monitor include functionality such that the BVM automatically sets itself to a minimal, or optimal, gap distance (g) during all operative states of the steam turbine. The processor 28 may be programmed to define an acceptable gap distance (g) for the different modes of operation that will ensure a safe distance between the blade tips and the sensor 25. Using turbine data and the currently determined gap, the blade vibration monitor can correct for changes in real time of the steam turbine geometry due to thermal, loading, and/or wear effects, for example.

In an embodiment, the proximity sensor 25 may be an optical sensor. The optical sensor 25 may include a fiber optic portion that detects blade passing events during blade vibration monitoring. In this embodiment, the BVM comprises a light source 54 and an illumination conduit having a transmission end for projecting the light source 54 onto the turbine blade tip and a receptor end for receiving the reflected light images from the turbine blade tip. Using the reflected light images, the processor 28 can precisely determine the gap distance (g) eliminating the need for using tip timing data to determine the gap distance (g).

In an embodiment, both the time of arrival measurement and gap measurement may be accomplished by the same proximity sensor 25. In a further embodiment, the probe 22 may include a plurality of sensors, one sensor 25, for example, to measure the gap, and another to focus on time of arrival measurements. In still a further embodiment, the probe 22 may include both an optical sensor and a proximity sensor adapted to sense blade passing events as described previously. In this case, the optical proximity sensor and the proximity sensor may provide redundancy functionality.

In an embodiment, the optical proximity sensor may be disposed adjacent to the tip of the probe but not within the probe 22. In this embodiment, measurements would need to be made in order to calibrate the probe position relative to the optical sensor position. This calibration data would be used by the processor 28 for determination of the gap distance.

The proximity sensor 25 may include a self-diagnostic system coupled to the processor 28. In response to a fault determination by the self-diagnostic system, the processor 28 may position the probe 22 to a predetermined standard depth. The predetermined standard depth may be based on an initial commissioning of the blade vibration monitor which takes a standard safety margin into account.

In an embodiment illustrated in FIG. 3, the positioning means 70 includes a positioning gear 74 coupled to a gear 72 on the probe whose rotation (shown by the counter-clockwise arrow) causes a threaded portion 60 of the probe 22 riding in a threaded guide within the mounting hole to move the probe 22 away from the rotor 16 or toward it. Wiring from the probe may be connected using a slip ring design or by allowing enough wire for the expected rotation of the probe 22 with integral optical sensor 25. Control of the gear 74 and the positioning gear 72 by the processor 28 enables a movement of the probe a probe depth (d) past the interior surface of the turbine casing 36 in a direction normal (shown by an arrow in FIG. 2) to the rotor 16 of the steam turbine engine.

In an alternate embodiment illustrated in FIG. 4, the positioning means 70 includes a gear and tooth arrangement 76. As the gear rotates, the teeth of the gear mesh with the a linear set of teeth disposed on the length of the probe moving the probe 22 a probe depth (d) past the interior surface of the turbine casing 36 in a direction normal (shown by an arrow in FIG. 4) to the rotor 16 of the turbine engine. A tight clearance exists between the mounting hole and the probe 22 so that the probe 22 may slide in the direction normal to the rotor 16 of the steam turbine engine.

The gap distance (g) may be set by the processor 28 controlling the positioning means 70 continuously in real time so that the positioning means 70 sets the gap distance in a matter of seconds, for example, in a range of 1-10 sec. In an embodiment, the gap distance (d) will be set to some fraction of an inch.

Referring to FIGS. 1-4, a method to set a gap distance (g) between a tip of a rotating turbine blade 14 and a sensor 25 disposed in a turbine casing 36 opposite the tip of the turbine blade 14 is also provided. The method includes disposing a probe 22 including the proximity sensor 25 in a mounting hole in the turbine casing 36 of a steam turbine engine. An optical proximity sensor 25 is disposed in close proximity to the probe 22 and is configured to measure a gap distance (g) between the probe 22 and a turbine blade 14 of the steam turbine engine. According to the method, a positioning means 70 positions a depth of the probe (d) with respect to the mounting hole 34. Based on the measured gap distance, a processor 28 may be used to control the positioning means 70 to adjust the probe depth (d) relative to the mounting hole in order to set the gap distance (g) in real time to a minimal gap distance.

In an embodiment, the probe 22 may be rotated by a turbine gear 72 so that a threaded portion 60 of the probe 22 riding in a corresponding threaded portion of the mounting hole moves the probe 22 a probe depth (d) past the interior surface of the turbine casing 36 in a direction normal to the rotor 16 of the steam turbine engine.

In an alternate embodiment, a gear 76 may be rotated so that the rotation of the gear 76 causes the gear to mesh with a linear set of teeth 76 moving the probe 22 a probe depth (d) past the interior surface of the turbine casing 36 in a direction normal to the rotor 16 of the steam turbine engine.

The disclosed blade vibration monitor (BVM) with a self-adjusting sensor gap mechanism may be reliably and cost-effectively used to accurately measure and set a gap between a turbine blade and a probe, having a sensor, disposed in a casing of a turbine engine. The improved performance of the blade vibration monitor, in the form of more accurate output from the blade vibration monitoring system (BVMS), can lead to more accurate equipment assessments and maintenance decisions. Furthermore, in one embodiment, existing probes having sensors already installed in the turbine casing may be used to provide a signal from which the gap distance may be determined. In an alternate embodiment, an optical sensor, utilizing an optical measurement, may be incorporated to the currently used probe such that it has the same footprint as the current probe. Optical measurement provides extremely accurate non-contacting sensing of the gap between the blade vibration monitor sensors and the blade tips as the optical proximity sensors are not affected by changes in the magnetism of the turbine blades that may occur over time.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A blade vibration monitor including a self-adjusting sensor gap mechanism, comprising:
   a probe configured to be disposed in a mounting hole within a turbine casing of a steam turbine;
   a proximity sensor disposed within a tip of the probe producing a signal in response to a turbine blade passing the sensor;
   a positioning means to position a depth of the probe with respect to the mounting hole; and
   a processor for processing the signal to determine a gap distance between the probe and the turbine blade, and wherein based on the determined gap distance the processor controls the positioning means to adjust the probe depth relative to the mounting hole in order to set the gap distance in real time to a minimal gap distance.

2. The blade vibration monitor as claimed in claim 1, wherein the processor uses the signal and real time turbine data to determine the minimal gap distance.

3. The blade vibration monitor as claimed in claim 2, wherein the real time turbine data is selected from the group consisting of thermal data, loading data, steam pressure and wear effects of the turbine blade.

4. The blade vibration monitor as claimed in claim 1, wherein the positioning means includes a turning gear configured to rotate the probe such that a threaded portion of the probe riding in a corresponding threaded portion of the mounting hole moves the probe a probe depth past the interior surface of the turbine casing in a direction normal to a rotor of the steam turbine engine.

5. The blade vibration monitor as claimed in claim 1, wherein the positioning means includes a gear and teeth arrangement such that a rotation of the gear causes the gear to mesh with a linear set of teeth moving the probe a probe depth past the interior surface of the turbine casing in a direction normal to a rotor of the steam turbine engine.

6. The blade vibration monitor as claimed in claim 1, wherein the proximity sensor further comprises a self-diagnostic system, and wherein in response to a fault determination by the self-diagnostic system, the processor moves the probe to a predetermined standard depth.

7. A blade vibration monitor including a self-adjusting sensor gap mechanism, comprising:
   a probe configured to be disposed in a mounting hole within a turbine casing of a steam turbine;
   an optical proximity sensor disposed in close proximity to the probe configured to measure a gap distance between the probe and a turbine blade of the steam turbine;
   a positioning means to position a depth of the probe with respect to the mounting hole; and
   a processor,
   wherein based on the measured gap distance the processor controls the positioning means to adjust the probe depth relative to the mounting hole in order to set the gap distance in real time to a minimal gap distance.

8. The blade vibration monitor as claimed in claim 7, wherein the optical proximity sensor is disposed within a tip of the probe.

9. The blade vibration monitor as claimed in claim 7, wherein the processor uses the measured gap distance and real time turbine data to determine the minimal gap distance.

10. The blade vibration monitor as claimed in claim 9, wherein the real time turbine data is selected from the group consisting of thermal data, loading data, and wear effects of the turbine blade.

11. The blade vibration monitor as claimed in claim 7, wherein the optical proximity sensor is disposed adjacent to the probe in the turbine casing.

12. The blade vibration monitor as claimed in claim 7, wherein the positioning means is a turning gear configured to rotate the probe such that a threaded portion of the probe riding in a corresponding threaded portion of the mounting hole moves the probe a probe depth past the interior surface of the turbine casing in a direction normal to a rotor of the steam turbine engine.

13. The blade vibration monitor as claimed in claim 7, wherein the positioning means is a gear and teeth arrangement such that a rotation of the gear causes the gear to mesh with a linear set of teeth moving the probe a probe depth past the interior surface of the turbine casing in a direction normal to a rotor of the steam turbine engine.

14. The blade vibration monitor as claimed in claim 7, wherein the optical proximity sensor further comprises a self-diagnostic system, and
   wherein in response to a fault determination by the self-diagnostic system, the processor moves the probe to a predetermined standard depth.

15. The blade vibration monitor as claimed in claim 7, comprising a further proximity sensor in order to provide a redundancy functionality.

16. A method for setting a gap distance between a tip of a rotating turbine blade and a proximity sensor disposed in a turbine casing opposite the tip, comprising:
   disposing a probe including the proximity sensor in a mounting hole in a turbine casing of a steam turbine engine;
   producing a signal by the proximity sensor in response to a turbine blade passing the proximity sensor,
   determining by a processor a gap distance between the probe and the turbine blade from the signal;
   positioning the probe a probe depth with respect to the mounting hole by a positioning means,
   wherein based on the determined gap distance the processor controls the positioning means to adjust the probe depth relative to the mounting hole in order to set the gap distance in real time to a minimal gap distance.

17. The method as claimed in claim 16, further comprising rotating the probe by a turbine gear such that a threaded portion of the probe riding in a corresponding threaded portion of the mounting hole moves the probe a probe depth past the interior surface of the turbine casing in a direction normal to a rotor of the steam turbine.

18. The method as claimed in claim 16, further comprising rotating a gear such that the rotation of the gear causes the gear to mesh with a linear set of teeth moving the probe a probe depth past the interior surface of the turbine casing in a direction normal to a rotor of the steam turbine.

19. The method as claimed in claim 16, wherein the positioning of the probe to the probe depth is accomplished in a range of 1-10 secs.

20. The method as claimed in claim 16, wherein the processor automatically sets itself to a minimal, or optimal, gap distance during all operative states of the steam turbine engine.

* * * * *